United States Patent

Cushman

[15] 3,704,026
[45] Nov. 28, 1972

[54] VEHICLE SUSPENSION MEANS

[72] Inventor: Walton W. Cushman, Fraser, Mich.

[73] Assignee: Martin Tucker, Trustee, New York, N.Y.

[22] Filed: Jan. 12, 1970

[21] Appl. No.: 2,227

Related U.S. Application Data

[63] Continuation-in-part of Ser. No. 713,160, March 14, 1968, Pat. No. 3,559,611.

[52] U.S. Cl. ................. 280/87 R, 267/63 R, 280/92
[51] Int. Cl. ............................................. B60g 11/22
[58] Field of Search ..... 280/87, 92, 96.2, 96; 267/63; 74/492

[56] References Cited

UNITED STATES PATENTS

| | | | |
|---|---|---|---|
| 2,859,978 | 11/1958 | Brimhall | 267/63 X |
| 2,819,060 | 1/1958 | Neidhart | 267/63 X |
| 2,179,959 | 11/1939 | Schroedter | 267/63 X |
| 2,450,015 | 9/1948 | Odegaard | 280/92 |
| 2,762,446 | 9/1956 | Worthington et al. | 280/92 X |
| 2,890,892 | 6/1959 | Strehlow | 280/92 |
| 2,819,063 | 1/1958 | Neidhart | 267/63 |
| 3,259,397 | 7/1966 | Doennecke | 280/96.2 |

*Primary Examiner*—Kenneth H. Betts
*Attorney*—Lon H. Romanski

[57] ABSTRACT

A vehicle suspension includes an outer tubular housing with a plurality of contoured or tapered surfaces formed internally thereof and an internally disposed shaft also provided with a plurality of contoured or tapered surfaces formed externally thereof; a plurality of elastomeric rings are situated between the internal and external tapered surfaces so as to be engageable therewith; the outer housing is carried by the vehicle body section so as to be movable therewith while the extending end of the shaft is connected to associated vehicular running gear such as ground engaging wheels; as the vehicular load is applied, the inner shaft and externally formed tapered surfaces move axially relative to the outer housing and internally formed tapered surfaces thereby progressively resiliently deforming the elastomeric rings therebetween so as to create a controlled spring rate therethrough; a steering tiller is connected through a worm gear and follower gear to the outer housing so as to enable both rotation of the outer housing and running hear relative to the vehicle as well as relative repositioning of the tiller with respect to the outer housing and running gear.

12 Claims, 10 Drawing Figures

PATENTED NOV 28 1972

INVENTOR.
Walton W. Cushman
BY
Lon H. Romanski
ATTORNEY

PATENTED NOV 28 1972

INVENTOR.
Walton W. Cushman
BY
Lou H. Romanski
ATTORNEY 3,704,026

VEHICLE SUSPENSION MEANS

RELATED APPLICATION

This application is a continuation-in-part of my earlier filed and copending application Ser. No. 713,160, filed in the United States Patent Office on Mar. 14, 1968, now U.S. Pat. No. 3,559,611 and entitled AMPHIBIOUS VEHICLE.

BACKGROUND OF THE INVENTION

In the past various forms of apparatus have been proposed for serving as vehicle suspension systems. However, such prior art structures have almost uniformly relied on the provision of metal springs of one form or another. For example, some have taken the form of leaf-type configuration, others have employed coiled compression springs while still others have used torsion bars. All of such prior art arrangements are costly in that they require a critical selection of steels of a particular grade along with close manufacturing tolerances including heat treating processes.

Attempts to avoid the use of such metal springs as by employing air-filled bellows type of spring arrangements have not proven to be totally acceptable.

A further defect in the prior art spring arrangements is the fact that they all require a considerable degree of space thereby often presenting problems of suitable location for mounting on the vehicle.

Accordingly, the invention as herein disclosed and described is concerned with the solution of the above as well as other related problems.

SUMMARY OF THE INVENTION

According to the invention, a vehicle suspension means comprises an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said first contoured surface means, and elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing.

Various general, as well as specific, objects and advantages of the invention will become apparent when reference is made to the following detailed description considered in conjunction with the accompanying drawings.

DESCRIPTION OF THE DRAWINGS

In the drawings, wherein for purposes of clarity certain elements and details may be omitted from one or more views.

DESCRIPTION OF THE PREFERRED EMBODIMENT

Figure 1:
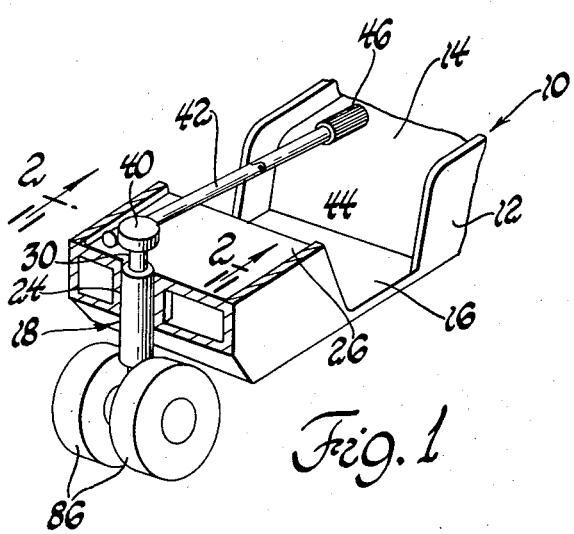
FIG. 1 illustrates, fragmentarily, in perspective (with portions thereof broken away and in cross-section) of a vehicle provided with a suspension arrangement constructed in accordance with the teachings of the invention.

Referring now in greater detail to the drawings, FIG. 1 illustrates, fragmentarily, a vehicle 10 having a body portion 12 including a seat 14 and a floor section 16 to accommodate an occupant or occupants as the case may be. A portion of the forward end of the vehicle body 12 has been cut away and shown in cross-section in order to better illustrate, in elevation, the steerable front suspension and running gear means 18 constructed in accordance with the teachings of the invention.

Figure 2:
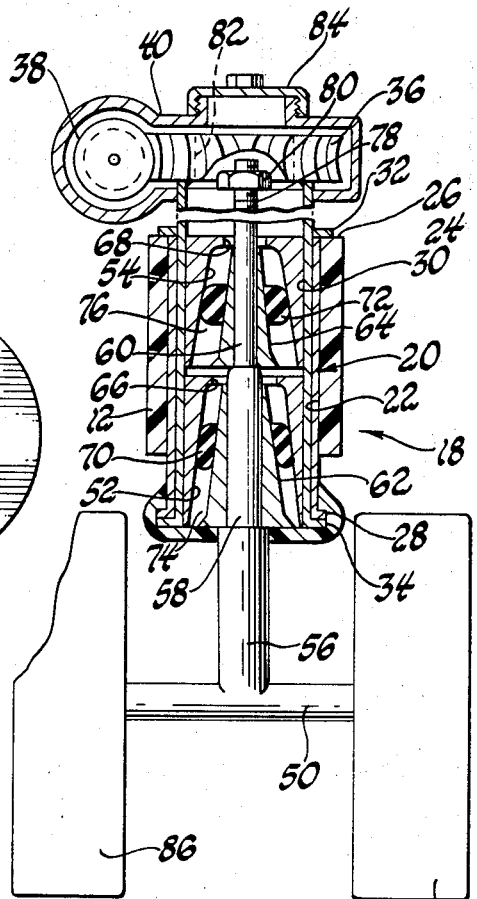
FIG. 2 is an enlarged cross-sectional view taken generally on the plane of line 2—2 of FIG. 1 and looking in the direction of the arrows.

Referring to both FIGS. 1 and 2, the integrated suspension and steering assembly 18 is illustrated as being comprised of an outer tubular member 20 which is suitably fixedly secured to the body 12, as in the passage 22, with the upper end 24 of the tube 20 being generally aligned with the top surface of the shelf or ledge 26 of the vehicle body 12 while the lower end thereof is provided with a flange 28. An inner tubular member 30, disposed in the outer tubular member 20, is restained against axial movement within the outer tubular member 20 by flanges 32 and 34 but nevertheless freely rotatable therein.

Figure 3:
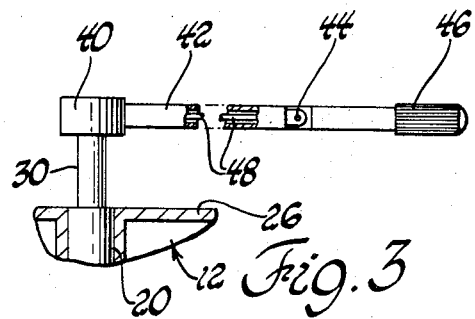
FIG. 3 is a slightly enlarged fragmentary side-elevational view of a portion of the steering mechanism associated with the suspension system of FIGS. 1 and 2.

The rotatable inner tube 30, which may extend upwardly beyond the shelf 32 any desired distance, has suitably, fixedly secured to the upper end thereof a circular worm follower gear 36, which is in mesh with a conventional hourglass worm gear 38 journaled in a conventional manner for rotation in a housing 40 containing the worm and follower gear assembly. The housing 40 is itself free to rotate on or about the upper end of the inner tube member 30 and has fixedly secured thereto the tubular tiller-like steering member 42, which may be hinged as at 44 (FIG. 3), and fitted with a rotatable handle 46 at the free end thereof. A flexible drive cable 48 is connected between handle 46 and the worm gear 38.

Thus, if the handle 46 is rotated, the worm gear 38 is rotated which, in turn, relatively slowly rotates the worm follower gear 36 and the inner tube 30 connected thereto. On the other hand, if the tiller 42 is swung horizontally right or left without rotating handle 46, as for normal steering, the housing 40 and the inner tube 30 will be rotated directly in either direction at a relatively more rapid rate because the worm gear 38 is journaled in the housing 40 and in mesh with the follower gear 36 which is suitably secured to the tube 30.

Having described how rotation of the inner tube 30 is accomplished, the operative connection between the tube 30 and the inverted T-mounting 50 will now be explained. It will be noted that the inner tube 30 has press fit or otherwise fixedly secured or formed therein a pair of female tapered sleeves or portions 52 and 54. The vertical member 56 of the T-mounting 50 is formed with reduced diameter portions 58 and 60 on which are press fit or otherwise fixedly secured or formed male tapered or conical sleeves or surfaces 62 and 64, respectively. The axial circular openings 66 and 68 in the female sleeves or portions 52 and 54, respectively, are of sufficient diameter so that the conical male sleeves or surfaces 62 and 64 have sufficient freedom of axial movement and so that the larger lower diameter portion of sleeve or surface 64 can pass through opening 66 on assembly.

It will be noted that elastomeric doughnut-like rings 70 and 72, which may have any desired specific dimensions and physical characteristics, are assembled, with any desired degree of initial compression in the clearances 74 and 76 between the respective adjacent male and female sleeves or surfaces, the rings 70 and 72 being secured against inadvertent removal by constriction of clearances 74 and 76 due to outward flaring of the male sleeves 62 and 64 at the bottom and by inward flaring of the female sleeves 52 and 54 at the top.

The upper free end of the member 56 may be threaded at 78 and fitted with a nut 80 larger than the opening 68 to serve as a stop and, if necessary, depending upon the height of the inner tube 30, the gear 36 may be formed with a central opening 82 to prevent interference with threaded end 78 and permit access to the nut 80 through the threaded opening in housing 40 closed by a cap 84.

It will thus be seen that the compressed rings 70 and 72 serve the dual functions of (a) friction steering means wherein member 56 is rotated when the inner tube 30 is rotated and (b) increasing spring rate suspension means between the vehicle 10 and its running gear such as wheels 86 supported on axles carried by or formed on member 50. The greater the axial displacement due to road shock, the progressively greater will be the restoration forces generated by the corresponding deformation of the doughnut rings 70 and 72.

It will be apparent, then, that normal steering is accomplished by operation of the tiller 42 and that rotation of the handle 46 provides a means for resetting the tiller 42 relative to the remainder of the suspension system and running gear. Thus, the vehicle 10 is characterized by 360° tiller steering, with reset capability so as to be operable from any seat position and/or from outside the vehicle, as when the operator may be walking alongside.

Figure 4:
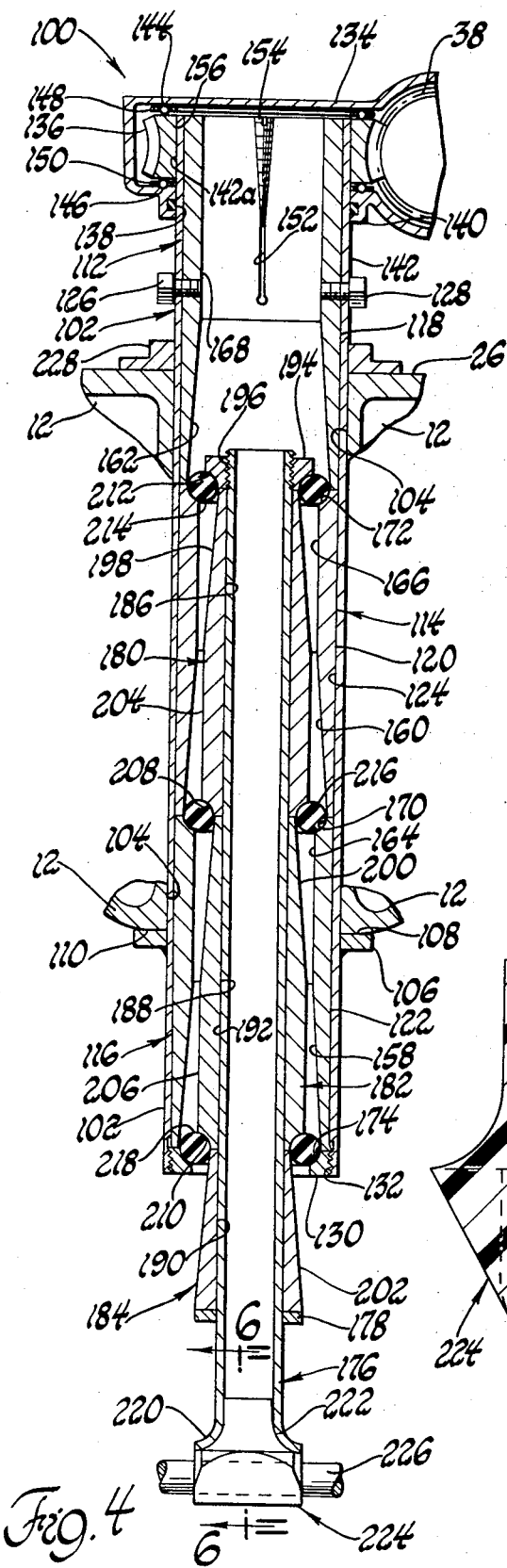
FIG. 4 is an enlarged axial cross-sectional view of a second embodiment of the invention.
Figure 5:
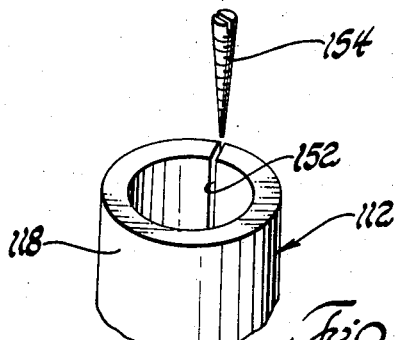
FIG. 5 is a fragmentary perspective view of a portion of the structure shown in FIG. 4.

A second embodiment of the invention is illustrated in FIGS. 4, 5, 6 and 7. Referring in greater detail to FIG. 4, primarily, it can be seen that the suspension system 100 is illustrated as being comprised of an outer tubular housing 102 closely received and journaled within bearing surface 104 formed in a portion of the vehicle body unit 12. An outwardly radiating shoulder or flange portion 106 formed on or secured to housing 102, as by welding, has an upper contacting surface 108 for operatively engaging a lower disposed surface 110 of vehicle body 12 so as to preclude further upward movement of tubular housing 102 relative to vehicle body 12.

A series of generally tubular female sleeve members 112, 114 and 116 are closely received within the outer tubular housing 102 in a manner so as to have their respective outer diameters 118, 120 and 122 in a close slip-fit relationship relative to the inner diameter 124 of outer housing 102. As illustrated, the upper female sleeve 112 is preferably secured to the outer housing 102 as by a plurality of screws 126 and 128 passing through the wall of outer housing 102 and threadably engaging the sleeve 112. Consequently, the intermediate sleeve 114 and lower end sleeve 116 may then be serially abuttingly engaged and locked against the lower end of upper sleeve 112 by means of an annular nut member 130 threadably engaged with an internally threaded portion 132 at the lower end of outer housing 102.

A gear housing 134, situated generally at the upper end of the suspension assembly 100, contains the worm gear 38, suitably journaled therein, and the worm gear follower gear 136. An O-ring type of seal 138 is carried by a lower collar portion 140 of the housing 134 so as to sealingly engage the outer diameter 142 of the outer tubular housing 102. As with housing 40 of FIGS. 1 and 2, housing 134 is rotatable with respect to the outer tubular housing 102 as well as with respect to follower gear 136 which is fixedly retained to the outer diameter 142 of the tubular housing 102 at the upper end thereof. Suitable upper and lower bearings 144 and 146 within bearing cages 148 and 150 are respectively situated between the upper and lower axial end surfaces of follower gear 136 and the respective juxtaposed inner surfaces of housing 134.

The follower gear 136 may, of course, be secured to the tubular housing 102 by any suitable means; however, one specific manner of effecting such a fixed relationship is illustrated as comprising an axially directed slit 152, formed through the wall of upper sleeve 112, which when expanded by suitable cam-like means, such as the tapered screw member 154 threadably engaged within the slit 152, enables a sufficient degree of radial expansion of the upper portion of sleeve 112 and tubular housing 102 in order to cause the upper outer diameter portion 142a of housing 102 to frictionally lock against the inner diameter 156 of follower gear 136. In order to accommodate such radial expansion the upper wall portion of tubular housing 102 may also be provided with suitable axially extending slit means formed therethrough. The housing 134 may be provided with suitable access means such as that illustrated in FIG. 2 and capped as by member 84, in order to provide a means for inserting a suitable tool therethrough for driving the screw 154.

The female sleeve members 112, 114 and 116 are respectively provided with internal tapered or conical surfaces 158, 160 and 162 which at their respective upper ends generally blend or intersect with internal cylindrical surfaces 164, 166 and 168. As shown, the upper end of lower sleeve 116 has an annular groove 170 formed therein of an arcuate cross-sectional configuration so that the widest-most end of such groove 172 blends as a continuation of the widest-most or lower end of the tapered surface 162 of upper female sleeve 112. Further, in the same manner, nut 130 has an annular groove 174 formed therein of an arcuate cross-sectional configuration so as to blend as an extension of the tapered surface 158 of lower female sleeve 116.

An inner disposed shaft or tubular member 176, which may be provided with an integrally formed shoulder or a flange 178 secured thereto as by welding, is generally disposed within the outer housing 102 and the female sleeves 112, 114 and 116. In contrast, shaft 176 is adapted to carry a series of generally tubular male sleeve members 180, 182 and 184 which are closely received about the inner tubular member 176 in a manner so as to have their respective inner diameters 186, 188 and 190 in a close slip-fit relationship relative to the outer diameter 192 of inner shaft 176.

As illustrated, the lower male sleeve 184 is axially abuttingly engaged against flange 178 while the intermediate sleeve 182 and upper male sleeve 180 are axially urged into locking arrangement against lower sleeve 184 by a nut 194 threadably engaged with an outer threaded portion 196 on the upper end of shaft 176.

The male sleeve members 180, 182 and 184 are respectively provided with external axially extending tapered or conical surfaces 198, 200 and 202; in the case of sleeve members 180 and 182, the tapered or contoured surfaces 198 and 200, at their respective lower ends, generally blend or intersect with external cylindrical surfaces 204 and 206. As shown, the lower end of upper male sleeve 180 has an annular groove 208 formed therein of an arcuate cross-sectional configuration so that the narrowest end of such groove 208 blends with, as a continuation of, the smallest or upper end of the tapered surface 200 of intermediate male sleeve 182. Similarly, the lower end of intermediate male sleeve 182 has an annular groove 210 formed therein of an arcuate cross-sectional configuration so that narrowest end of such groove 210 blends as a continuation of the narrowest or upper end of the tapered surface 202 of lower male sleeve 184. Further, in the same manner, nut 194 has an annular groove 212 formed therein of an arcuate cross-sectional configuration so as to blend as an extension of the tapered surface 198 of upper male sleeve 180.

A plurality of doughnut-like rings 214, 216 and 218 are provided so as to be situated generally within the space between the inner shaft 176, along with its associated male sleeves, and the outer tubular housing 102, along with its associated female sleeves. Each of the suspension rings 214, 216 and 218 is formed of an elastomeric material so as to be susceptible of experiencing resilient deformation.

The lower end of shaft 176 may be flared as at 220 so as to accommodate the reception therein of an upper pilot-like portion 222 of an axle support block 224. The support block 224 is also preferably comprised of a suitable elastomeric material which, although exhibiting sufficient strength for the anticipated loads and possible shocks to be carried by the suspension system, nevertheless is capable of exhibiting a degree of resilient deflection in order to permit the axle 226 and associated wheels (such as at 86) to at least partly accommodate changes in the grade of the terrain being traversed. The support block 224 may, of course, be secured to the shaft 176 as by a suitable cementing agent or, if desired, retained therein by any desired mechanical holding means many of which are well known in the art.

The suspension system 100 as illustrated in FIG. 4 is shown in what may be termed a relaxed state. That is, in this condition the axle 226 and associated wheels (or other running gear if such be employed) are not providing any support for the vehicle 10 through the vehicle body 12. This might well happen, for example, when the vehicle body 12 has had some upward acceleration imparted thereto, as by virtue of hitting some bump, causing the vehicle body 12 to tend to lift the vehicle wheels off the ground surface. In this connection, it might be mentioned that preferably a suitable collar-like stop member 228 is provided about outer housing 102 and suitably detachably secured thereto so as to function as a thrust member preventing undesirable axial movement of the outer housing 102 relative to the vehicle body 12.

Accordingly, as can be seen, whenever the suspension system has been fully extended further relative downward movement of the inner shaft or strut 176 is prevented by having the respective arcuate or annular grooves formed in the lower ends of the male sleeves 180, 182 and upper nut 184 abuttingly engage the resilient rings 218, 214 and 216 which are, in turn, precluded from further downward movement by the coacting annular and arcuate grooves 172, 170 and 174 formed in the upper ends of female sleeves 114, 116 and lower nut 130. Therefore, it can be seen that such coacting opposed annular arcuate grooves and resilient rings perform a function of providing a relatively resilient abutment means for limiting the maximum outward travel of the inner strut 176 relative to the outer housing 102 and associated vehicle body 12.

Now, as the vehicle load is increasingly supported by the associated ground-engaging wheels and axle 226, the resulting forces are such as to urge said inner shaft or strut 176 to move upwardly with respect to housing 102 and body 12 so as to become generally at least partly telescoped therewithin. Such upward movement of inner shaft 176, through frictional engagement between rings 214, 216 and 218, of course, is accompanied by a similar rolling action between the inner surfaces of the resilient rings and the tapered or contoured outer surfaces 198, 200 and 202 of the male sleeves 180, 182 and 184 causing such resilient rings to assume positions progressively further inward from the upper ends of the male sleeves generally along the contoured or tapered surfaces thereof.

Such relative movements of the components results in a resilient deflection or squeezing of the rings 214, 216 and 218 causing them to assume configurations as depicted generally by rings 70 and 72 of the embodiment of FIG. 2. Of course, the greater the load transmitted through the suspension system, the greater the deflection of such resilient rings 214, 216 and 218 resulting in a progressively greater spring force being developed thereby.

It should be noted that the resilient rings of each of the embodiments not only provide a means for developing a varying spring force for the suspension system but also provide a means for guiding or piloting the inner shaft 176 during its axial movements.

The gear 38, as in the FIG. 2 embodiment, is connected as through the cable 48 (FIG. 3) to the handle 46 carried at the end of tiller 42. Therefore, rotation of the handle 46 will cause a relative angular change of the tiller 42 with respect to the outer housing 102 and the running gear as explained with reference to the FIG. 2 embodiment. In contrast, horizontal movement of the tiller 42 is transferred directly to the outer housing 102 causing such housing 102 to rotate within journal 104 a like degree. Such rotation of outer housing 102 is transferred to the inner shaft 176 via the resilient rings 214, 216 and 218 thereby causing the axle 226 and associated wheels or running gear to turn an amount equivalent to the movement of tiller 42.

Figure 7:
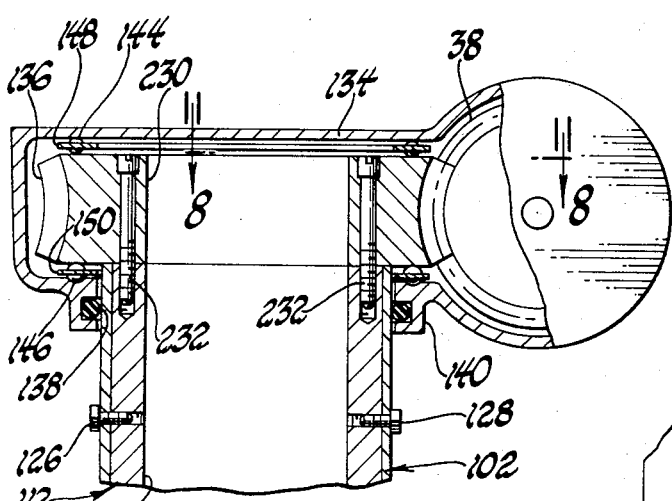
FIG. 7 is an enlarged fragmentary portion, in axial cross-section of a modified form of the structure as shown in, for example, FIG. 4.
Figure 8:
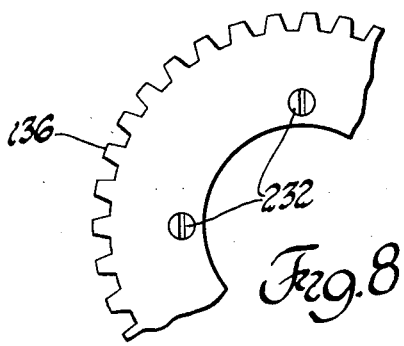
FIG. 8 is a fragmentary view taken generally on the plane of line 8—8 of FIG. 7 with certain of the associated structure removed.

FIGS. 7 and 8 fragmentarily illustrate a modification of the invention as, for example, generally shown in FIG. 4. All elements which are like or similar to those of FIG. 4 are identified with like reference numbers. In essence, the basic difference between the structures of FIGS. 7 and 4 resides in the fact that in the embodiment of FIG. 7 the worm follower gear 136 is provided with a body portion 230 which in effect rests against the upper end of the inner or female sleeve 112 and outer housing 102. The follower gear 136 is then secured as by a plurality of screws 232 threadably engaged as in the sleeve member 112. This then makes it unnecessary to provide an expanding type of locking arrangement as disclosed by FIGS. 4 and 5.

Figure 9:
FIG. 9 is an axial cross-sectional view of a modified form of an elastomeric member employable in the invention.

As was previously mentioned, the doughnut rings may be of any suitable configuration. For example, the rings 70 and 72 of FIG. 2 as well as the rings 214, 216 and 218 of FIG. 4 are each illustrated as being of a substantially uniform solid cross-section. However, as illustrated in FIG. 9, it is contemplated that at least certain of such resilient rings could have a hollow cross-section as shown at 240 of the modified ring 242. Further, it is contemplated that such resilient rings would be molded as a single piece; however, they could also be formed of a suitable length of cylindrical material which would then be formed into a ring by joining the opposite ends thereof. For example, if in FIG. 10, 244 represented such a length of elastomeric material having ends 246 and 248 (which were preferably cut normal to the axis thereof), the length of material could be curled as to place such ends 246 and 248 into juxtaposed relationship whereupon they could be joined to each other as by heat welding thereof.

Figure 10:
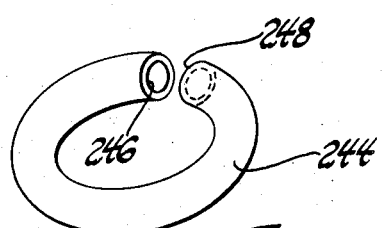
FIG. 10 is a perspective view of another modified form of an elastomeric member employable within the invention.
Figure 6:
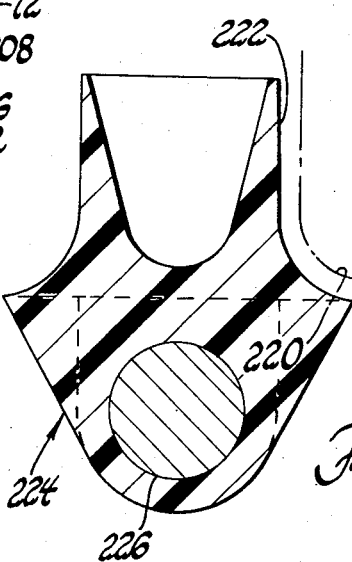
FIG. 6 is an enlarged cross-sectional view taken generally on the plane of line 6—6 of FIG. 4 and looking in the direction of the arrows.

In comparing a molded suspension ring to one fabricated as generally shown in FIG. 10, it should become apparent that different operating characteristics can be obtained by a selective use thereof. For example, in a molded form of ring, there are no mechanical stresses within the ring when in its free state. Accordingly, when a molded ring starts to roll, as for example, upwardly in FIG. 4, the inner portion of the ring is gradually stretched placing such portion of the ring under circumferential tension while the outer portion of the same ring starts to experience a squeezing placing such portion under circumferential compression. After a certain distance of rolling movement of such a molded ring (the distance being a factor of the cross-sectional diameter of the ring) such induced circumferential tension and compression forces tend to reverse themselves thereby imparting a pre-determined negative or positive spring effect into the suspension system. This could be of material benefit where certain varying side qualities were desired as also where, for example, all of the rings, as shown in FIG. 4, were not to start rolling movement along the suitably contoured surfaces of the female sleeves simultaneously with each other but rather in a delayed or staggered relationship.

Because of the exceptionally high hysteresis type energy losses resulting from the deformation of many elastomers, particularly the urethanes, this offers a high damping capability wherein the immediate restoration force is always less than the required displacement force.

In comparison, rings constructed in accordance with the structure of FIG. 10, because the actual physical length of the portion 244 would be equal at all points and when curled and welded into the ring form, would have their inner diameters always under circumferential compression while the outer portion or diameter of the ring would always be under tension. Therefore, by definition, a neutral (neutral in that it is neither under compression or tension) axis would exist in such fabricated ring between the inner and outer diameters thereof.

Although only a select number of embodiments of the invention have been disclosed and described, it is apparent that other embodiments and modifications of the invention are possible within the scope of the appended claims.

I claim:

1. Vehicle suspension means, comprising an outer housing having an interior cylindrical surface and adapted to be carried by said vehicle, first inner sleeve-like contoured surface means carried internally of said housing and retained against said cylindrical surface, a strut at least partly received within said outer housing and said first inner sleeve-like contoured surface means so as to have a portion extending beyond an end of said outer housing, said strut having a cylindrical outer surface and including a radiating flange-like surface, said portion of said strut being adapted for connection to associated running gear for said vehicle, second outer sleeve-like contoured surface means carried externally of said strut so as to be situated generally within said outer housing and said first inner sleeve-like contoured surface means and against said cylindrical outer surface, said second outer sleeve-like contoured surface means being axially seated against said flange-like surface, and ring like elastomeric means situated generally about said second outer sleeve-like contoured surface means and between said first and second sleeve-like contoured surface means so as to engage both of said first and second sleeve-like contoured surface means, said ring-like elastomeric means being effective to undergo resilient radial deformation between said first and second sleeve-like contoured surface means and thereby provide a resultant spring force for resiliently suspending said vehicle whenever said strut is urged in a direction generally telescopingly inwardly of said outer housing, said ring-like elastomeric means being further effective to frictionally convey a rotating torque from said outer housing to said strut whenever said outer housing is rotated about the longitudinal axis of said interior cylindrical surface in order to rotate said strut and said associated running gear in accordance therewith.

2. Vehicle suspension means, comprising an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said first contoured surface means, and elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing, said outer housing being of a generally elongated tubular configuration said first contoured surface means carried internally of said housing comprising a plurality of first contoured surfaces spaced from each other axially along said housing, each of said spaced first contoured surfaces having an inner annular configuration when viewed in planes passing normal to the axis of said housing and a generally inner tapered configuration when viewed in planes passing through and containing said axis of said housing, each of said spaced first contoured surfaces being positioned as to have the largest inner cross-sectional annular configuration thereof opening in the direction of said end of said outer housing, and said second contoured surface means carried externally of said strut comprising a plurality of second contoured surfaces spaced from each other axially along said strut, each of said spaced second contoured surfaces having an outer annular configuration when viewed in planes passing normal to the axis of said strut and a generally outer tapered configuration when viewed in planes passing through and containing said axis of said strut, each of said spaced second contoured surfaces being positioned as to have the largest outer cross-sectional annular configuration thereof in the direction of said portion of said strut adapted for connection to said running gear.

3. Vehicle suspension means, comprising an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said first contoured surface means, and elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing, said first contoured surface means comprising at least first and second inner annular surfaces each tapering radially inwardly from a maximum opening at the respective lower ends thereof to a minimum diameter at the respective upper ends thereof, the lower and upper ends of each of said inner annular surfaces being spaced from each other axially along said housing and said inner annular surfaces being further positioned as to be generally serially aligned with each other, and said second contoured surface means comprising at least first and second outer annular surfaces each tapering radially inwardly from a maximum outer diameter at the respective lower ends thereof to a minimum outer diameter at the respective upper ends thereof, the lower and upper ends of each of said outer annular surfaces being spaced from each other axially along said strut and said outer annular surfaces being further positioned as to be generally serially aligned with each other.

4. Vehicle suspension means according to claim 3, wherein said elastomeric means comprises at least first and second annular ring-like members situated generally between said inner and outer annular surfaces, said first and second ring-like members being spaced from each other so that said first ring-like member is rollingly confined by and between said first inner annular surface and said first outer annular surface while said second ring-like member is rollingly confined by and between said second inner annular surface and said second outer annular surface, each of said ring-like members being adapted to undergo radially directed squeezing whenever said outer housing and said strut are moved axially toward each other.

5. Vehicle suspension means, comprising an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said first contoured surface means, elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing, said outer housing being journaled for rotation with respect to said vehicle generally about a longitudinal axis of said strut, and steering means operatively connected to said outer housing for effecting desired degrees of said rotation of said outer housing, said elastomeric means comprising at least one annular ring-like member situated between said first and second contoured surface means, said ring-like member being adapted to both rollingly move along said first and second contoured surface means as well as undergo elastic deformation whenever said housing and said strut are axially moved with respect to each other, said ring-like member being further effective to frictionally convey a rotating torque from said outer housing to said strut whenever said outer housing is rotated by said steering means in order to rotate said strut and said associated running gear in accordance therewith.

6. Vehicle suspension means, comprising an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said first contoured surface means, elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing, said outer housing being journaled for rotation with respect to said vehicle generally about a longitudinal axis of said strut, and steering means operatively connected to said outer housing for effecting desired degrees of rotation of said outer housing said strut and said associated running gear.

7. Vehicle suspension means according to claim 6, wherein said steering means comprises a tiller member operatively connected to said outer housing so as to be effective upon being swung generally about the longitudinal axis of said strut to cause like rotation of said outer housing.

8. Vehicle suspension means according to claim 6, wherein said steering means comprises a driven gear operatively secured to said outer housing for rotation therewith, a gear housing situated generally about said driven gear and angularly rotatable with respect to said outer housing generally about said longitudinal axis, a drive gear carried within said gear housing and adapted for meshed engagement with said driven gear, a vehicle operator steering control structure operatively connected to said gear housing and said drive gear, said steering control structure including a first steering member fixedly secured to said gear housing so that rotation of said first steering member by said vehicle operator results in a direct correlated journaled rotation of said driven gear and said outer housing, and said steering control structure further including a second steering member operatively connected to said drive gear and adjustably positionable with respect to said first steering member, said second steering member being effective upon being adjustably positioned to effect movement of said drive gear relative to said driven gear in order to thereby cause said gear housing and said first steering member to move angularly about said outer housing without causing journaled rotation of said outer housing with respect to said vehicle.

9. Vehicle suspension means according to claim 8, wherein said first steering member comprises a tiller connected at one end to said gear housing and having its other end swingable generally about said longitudinal axis of said strut, and wherein said second steering member comprises a rotatable adjustment member journaled on said tiller generally at said other end of said tiller, and wherein said rotatable adjustment member is directly connected to said drive gear by suitable motion transmitting means so that rotation of said rotatable adjustment member results in corresponding movement of said drive gear.

10. Vehicle suspension means according to claim 9, wherein said driven gear comprises a worm follower gear, wherein said drive gear comprises a worm gear held continuously in meshed engagement with said follower gear, wherein said tiller comprises a tubular body, and wherein said motion transmitting means comprises a suitable torque responsive drive cable passing through said tubular body and connected at its opposite ends to said rotatable adjustment member and said worm gear.

11. Vehicle suspension means according to claim 10, wherein said tubular body comprises a first tubular section and a second tubular section with said tubular sections being arranged in general axial alignment with each other, and pivot means operatively engaging the juxtaposed ends of said aligned tubular sections to enable one of said tubular sections to be hinged thereabout in order to permit said one tubular section to be at times swung upwardly about said pivot means.

12. Vehicle suspension means, comprising an outer housing adapted to be carried by said vehicle, first contoured surface means carried internally of said housing, a strut at least partly received within said outer housing and said first contoured surface means so as to have a portion extending beyond an end of said outer housing, said portion of said strut being adapted for connection to associated running gear for said vehicle, second contoured surface means carried externally of said strut so as to be situated generally within said outer housing and said contoured surface means, elastomeric means situated generally about said second contoured surface means and between said first and second contoured surface means so as to operationally engage both of said first and second contoured surface means, said elastomeric means being effective to undergo resilient deformation between said contoured surface means and thereby provide a resultant spring force for resiliently suspending said vehicle whenever said strut is urged in a direction generally telescopingly inwardly of said outer housing, and opposed abutment surfaces carried by said outer housing and said strut, said opposed abutment surfaces being adapted to contain therebetween and bear against said elastomeric means whenever said strut has been extended a maximum distance beyond said one end of said outer housing.

* * * * *